United States Patent
Lee et al.

(10) Patent No.: US 12,263,780 B2
(45) Date of Patent: Apr. 1, 2025

(54) VEHICULAR VARIABLE SPOILER LIGHTING APPARATUS

(71) Applicant: HYUNDAI MOBIS CO., LTD., Seoul (KR)

(72) Inventors: Soon Mo Lee, Yongin-si (KR); Do Hyung Kim, Yongin-si (KR); Chan Ho Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/616,969

(22) Filed: Mar. 26, 2024

(65) Prior Publication Data
US 2025/0050803 A1 Feb. 13, 2025

(30) Foreign Application Priority Data
Aug. 11, 2023 (KR) .................. 10-2023-0105920

(51) Int. Cl.
*B60Q 1/26* (2006.01)
*B60Q 1/00* (2006.01)
*B62D 35/00* (2006.01)

(52) U.S. Cl.
CPC ......... *B60Q 1/2646* (2013.01); *B60Q 1/0041* (2013.01); *B62D 35/007* (2013.01)

(58) Field of Classification Search
CPC ... B60Q 1/2646; B60Q 1/0041; B62D 35/007
See application file for complete search history.

(56) References Cited

U.S. PATENT DOCUMENTS

| | | | |
|---|---|---|---|
| 2022/0402564 A1* | 12/2022 | Rose | B62D 37/02 |
| 2023/0014189 A1* | 1/2023 | Mitchell | B62D 35/007 |
| 2023/0053837 A1* | 2/2023 | Chung | B62D 37/02 |
| 2023/0069045 A1* | 3/2023 | Rose | B62D 35/007 |
| 2023/0202586 A1* | 6/2023 | Matsui | B62D 35/007 296/180.5 |
| 2023/0264761 A1* | 8/2023 | Nakamura | B62D 37/02 296/180.5 |

FOREIGN PATENT DOCUMENTS

KR 10-2023-0035848 A 3/2023

* cited by examiner

*Primary Examiner* — Christopher E Dunay
(74) *Attorney, Agent, or Firm* — NSIP Law

(57) ABSTRACT

A variable spoiler apparatus including a spoiler unit movably provided in a rear section of a vehicle and configured to extend or be tilted toward a direction opposite from a forward traveling direction of the vehicle according to a traveling mode of the vehicle and a rear lamp provided in the spoiler unit and configured to emit light toward the direction opposite from the forward traveling direction.

14 Claims, 7 Drawing Sheets

VEHICULAR VARIABLE SPOILER LIGHTING APPARATUS

CROSS-REFERENCE TO RELATED APPLICATION

This application claims priority under 35 USC § 119(a) of Korean Patent Application No. 10-2023-0105920, filed on Aug. 11, 2023, the entire disclosure of which is incorporated by reference for all purposes.

BACKGROUND

1. Field

Exemplary embodiments relate to a vehicular variable spoiler lighting apparatus, and more particularly, to a vehicular variable spoiler lighting apparatus being capable of improving aerodynamic performance and of providing visual information to a driver, a nearby vehicle, and a pedestrian.

2. Description of the Related Art

A spoiler may be mounted on a vehicle. The spoiler prevents the vehicle from being lifted from the road surface due to an air vortex phenomenon during high-speed traveling, thereby enhancing the traction of the tires on the road surface. In recent years, variable spoilers that vary in position and direction according to a speed of the vehicle have become available in the market.

Only the tilting angle in the upward-downward direction of a variable spoiler in the related art can be adjusted. Particularly, there also occurs a problem in that the variable spoiler cannot be identified at night from the outside of the vehicle. Therefore, there is a need to address these problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a variable spoiler apparatus including a spoiler unit movably provided in a rear section of a vehicle and configured to extend or be tilted toward a direction opposite from a forward traveling direction of the vehicle according to a traveling mode of the vehicle and a rear lamp provided in the spoiler unit and configured to emit light toward the direction opposite from the forward traveling direction.

The rear section may include a roof body, the spoiler unit being seated on the roof body in a manner that is slidably movable and an actuator unit provided on the roof body and connected to the spoiler unit, the actuator unit being configured to move the spoiler unit in a straight line and to vary a tilting angle of the spoiler unit.

The spoiler unit may include a first spoiler seated on the roof body and connected to the actuator unit, the first spoiler being configured to move in a forward-backward direction of the vehicle by operation of the actuator unit and a second spoiler seated on the first spoiler, rotatably coupled to the first spoiler, and connected to the actuator unit, the second spoiler being configured to be tilted in a heightwise direction of the vehicle by the operation of the actuator unit.

The rear lamp may include a first lamp unit provided in the first spoiler and second lamp units provided in the first spoiler and arranged on both sides, respectively, of the first lamp unit.

The second lamp units may be configured to be exposed or not exposed according to a tilting angle of the second spoiler.

The actuator unit may include a first actuator unit connected to the first spoiler, the first actuator unit being configured to move the first spoiler in a straight line in the forward-backward direction of the vehicle and a second actuator unit connected to the second spoiler, the first actuator unit being configured to vary a tilting angle of the second spoiler in the heightwise direction of the vehicle.

The apparatus may include a control unit configured to control an operation of each of the first and second actuator units.

The apparatus may include side spoilers movably provided in the rear section and arranged on both sides, respectively, of the rear section, the side spoilers being configured to move together with the spoiler unit in conjunction with the spoiler unit.

In a general aspect, here is provided a spoiler apparatus including one or more processors configured to execute instructions and a memory storing the instructions, wherein execution of the instructions configures the one or more processors to control a first actuator configured to move a first spoiler of a spoiler assembly along a forward direction and control a second actuator configured to move a second spoiler of the spoiler assembly in a vertical direction relative to the forward direction, the first spoiler first lights, the first lights being configured to face in a rear direction, opposite to the forward direction, and the first spoiler further including second lights, the second lights being configured to be obscured by the second spoiler while the first spoiler is in a flat orientation.

The forward direction may be defined by a forward direction of a vehicle including the spoiler assembly.

The second spoiler may be rotatably connected to the first spoiler.

The second lights may be configured to be exposed in the rear direction when the first spoiler is tilted upward.

The controller may be further configured to control a first movement of the first spoiler and a second movement of the second spoiler responsive to a sensed vehicular speed of a vehicle including the spoiler apparatus.

Figure 1:
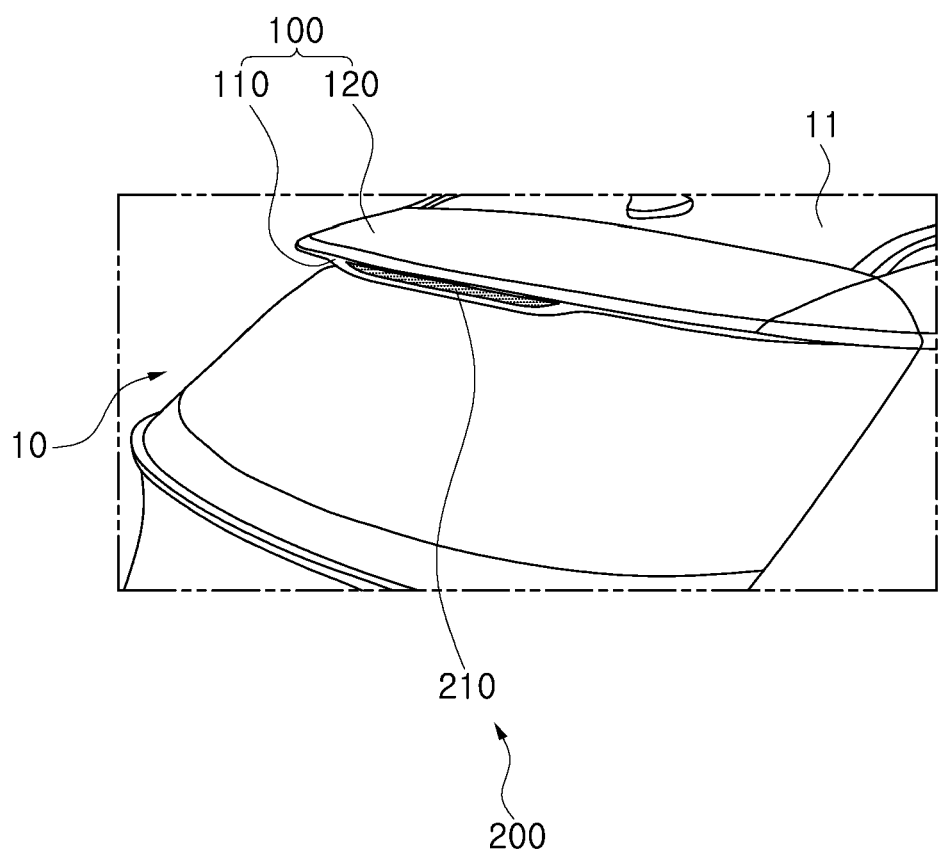
FIG. 1 is a perspective view illustrating a vehicular variable spoiler lighting apparatus according to a first embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
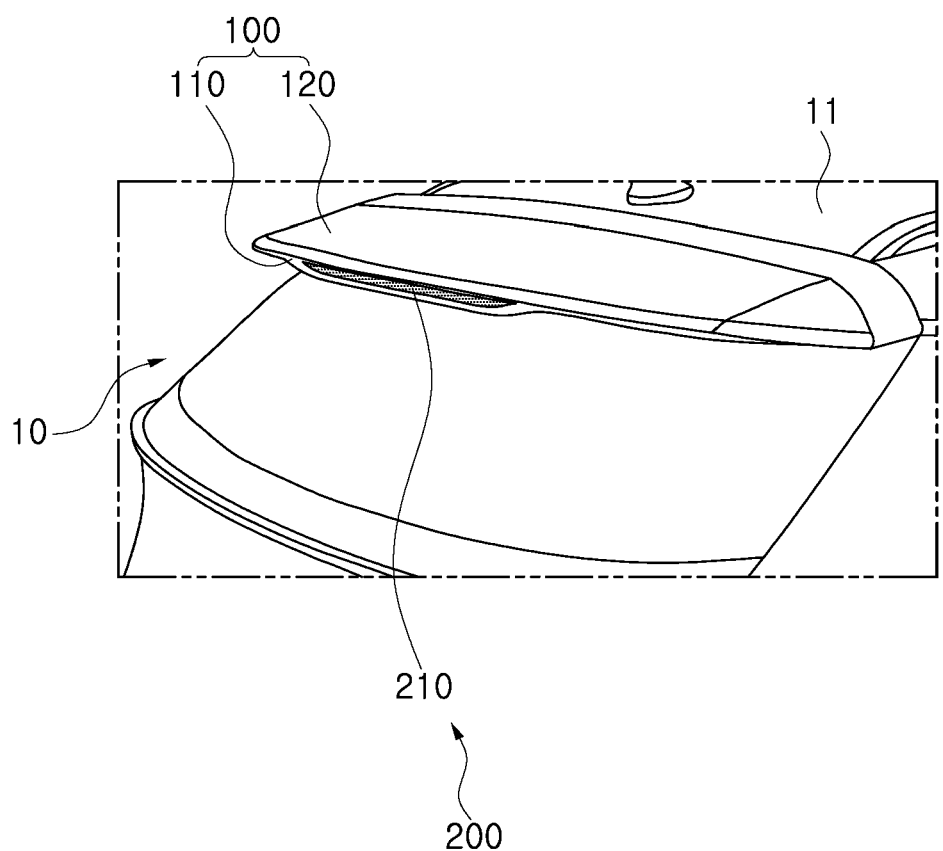
FIG. 2 is a perspective view illustrating a state where a spoiler unit of the vehicular variable spoiler lighting apparatus according to the first embodiment of the present disclosure moves away from a vehicle's forward traveling direction.
Figure 3:
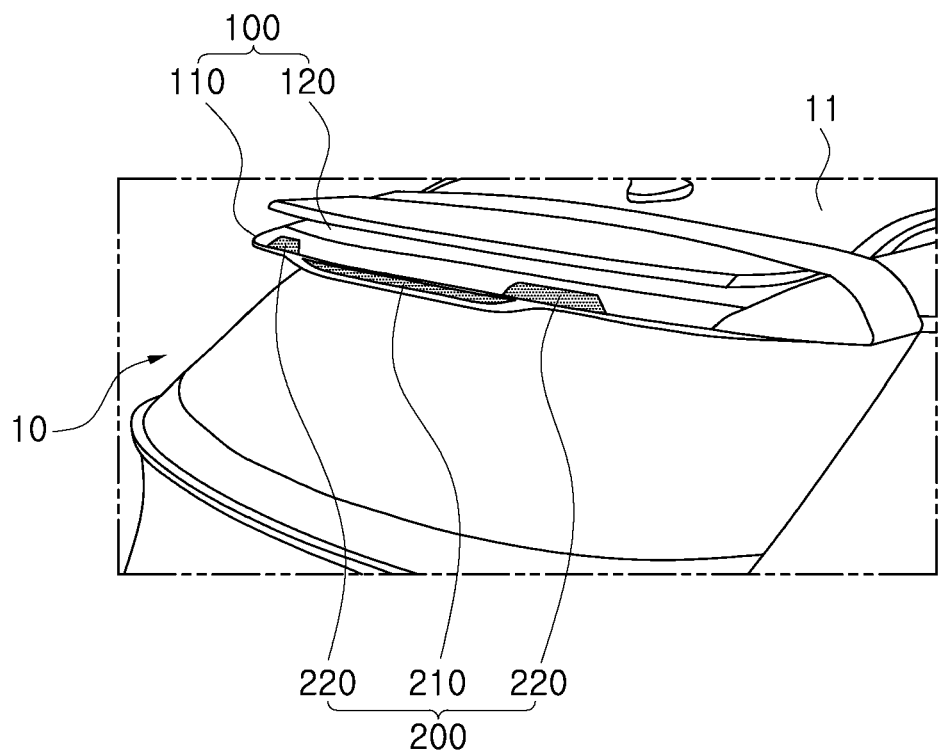
FIG. 3 is a perspective view illustrating a state where a second spoiler of the vehicular variable spoiler lighting apparatus according to the first embodiment of the present disclosure is tilted.

FIG. 1 is a perspective view illustrating a vehicular variable spoiler lighting apparatus according to a first embodiment of the present disclosure. FIG. 2 is a perspective view illustrating a state where a spoiler unit 100 of the vehicular variable spoiler lighting apparatus according to the first embodiment of the present disclosure moves away from a vehicle's forward traveling direction. FIG. 3 is a perspective view illustrating a state where a second spoiler 120 of the vehicular variable spoiler lighting apparatus according to the first embodiment of the present disclosure is tilted.

The vehicular variable spoiler lighting apparatus according to the first embodiment of the present disclosure includes the spoiler unit 100 and a rear lamp 200, which are described in detail below.

The spoiler unit 100 is movably provided in a rear section 10 of the vehicle. The spoiler unit 100 may be arranged horizontally toward the widthwise direction of the vehicle.

The spoiler unit 100 moves in the forward-backward direction of the vehicle according to a traveling mode of the vehicle. Thus, the spoiler unit 100 may protrude toward the direction of moving away from the vehicle's forward traveling direction, thereby having an elongated length in the direction of moving away from the vehicle's forward traveling direction.

In addition, the spoiler unit 100 may be tilted in the heightwise direction of the vehicle, that is, in the upward-downward direction of the vehicle according to the traveling mode of the vehicle. Examples of the traveling mode of the vehicle here may include a normal mode, a GT1 mode, and a GT2 mode, among other modes. The spoiler unit 100 may include a first spoiler 110 and the second spoiler 120.

The rear section 10 may refer to a rear roof, a rear pillar, a rear door, or a rear bumper of the vehicle. In the present embodiment, the rear section 10 of the vehicle is described, taking the rear roof of the vehicle as an implementation example. The rear section 10 may include a roof body 11 and an actuator unit 12.

The spoiler unit 100 may be seated on the roof body 11 in a slidably movable manner. The spoiler unit 100 may move, in a state of being seated on the roof body 11, in the forward-backward direction of the vehicle.

The actuator unit 12 may be provided on the roof body 11. The actuator unit 12 is connected to the spoiler unit 100, thereby enabling the spoiler unit 100 to move in a straight line. In other words, the actuator unit 12 may move the spoiler unit 100 in a straight line toward the forward-backward direction.

In addition, the actuator unit 12 is connected to the spoiler unit 100, thereby enabling a tilting angle of the spoiler unit 100 to vary. In other words, the actuator unit 12 may vary the tilting angle of the spoiler unit 100 in the heightwise direction (the upward-downward direction) of the vehicle. The actuator unit 12 may include a first actuator unit 12*a* and a second actuator unit 12*b*.

The first spoiler 110 may be seated on the roof body 11. The first spoiler 110 is connected to the actuator unit 12, and, by operation of the actuator unit 12, may move in the forward-backward direction of the vehicle. In other words, by the operation of the actuator unit 12, the first spoiler 110 seated on the roof body 11 may protrude toward the direction of moving away from the vehicle's forward traveling direction, thereby having an elongated length in the direction of moving away from the vehicle's forward traveling direction.

The second spoiler 120 may be seated on the first spoiler 110. In other words, the second spoiler 120 and the first spoiler 110 may be stacked on top of each other. The second spoiler 120 may be rotatably coupled to the first spoiler 110. In other words, one side, facing toward the vehicle's forward traveling direction, of the second spoiler 120, may be coupled to one side, facing toward the vehicle's forward traveling direction, of the first spoiler 110, with a hinge shaft in between.

The second spoiler 120 is connected to the actuator unit 12, and, by the operation of the actuator unit 12, may be tilted in the heightwise direction of the vehicle. In other words, the first spoiler 110 moves, from the roof body 11, away from the vehicle's forward traveling direction, and then, the second spoiler 120 may be tilted.

The first actuator unit 12*a* may be connected to the first spoiler 110. The first actuator unit 12*a* may move the first spoiler 110 in a straight line in the forward-backward direction of the vehicle.

The second actuator unit 12*b* may be connected to the second spoiler 120. The second actuator unit 12*b* may vary a tilting angle of the second spoiler 120 in the heightwise (i.e., vertical) direction of the vehicle.

The rear lamp 200 may be provided in the spoiler unit 100. The rear lamp 200 may emit light in the opposite direction to the vehicle's forward traveling direction. In other words, light in the shape of a line or of points is emitted through an edge of the spoiler unit 100 facing toward the direction of moving away from the vehicle's forward traveling direction.

The rear lamp 200 may be a high mounted stop lamp (HMSL) or a tail lamp. The rear lamp 200 may include light emitting diodes (LEDs). The rear lamp 200 may include a first lamp unit 210 and second lamp units 220.

The first lamp unit 210 may be provided in the first spoiler 110. The first lamp unit 210 may be positioned on the center portion of an edge of the first spoiler 110 facing toward the opposite direction (i.e., a rear direction) to the vehicle's forward traveling direction.

The second lamp units 220 may be provided in the first spoiler 110. The second lamp units 220 may be positioned on the edge of the first spoiler 110 facing toward the opposite direction to the vehicle's forward traveling direction and may be arranged on both sides, respectively, of the first lamp unit 210.

The second lamp units 220 may be exposed to the outside or may not be exposed to the outside according to the tilting angle of the second spoiler 120. In other words, in a case where the second spoiler 120 has a tilting angle of 0 degrees (i.e., a flat orientation), the second lamp units 220 are blocked by the second spoiler 120, and thus, light emitted from the second lamp units 220 cannot propagate to the outside.

In a case where the second spoiler 120 is tilted upward and thus where the tilting angle thereof exceeds 0 degrees, the light emitted from the second lamp units 220 can propagate to the outside. Thus, whether or not the second spoiler 120 operates can be checked from the outside.

Figure 4:
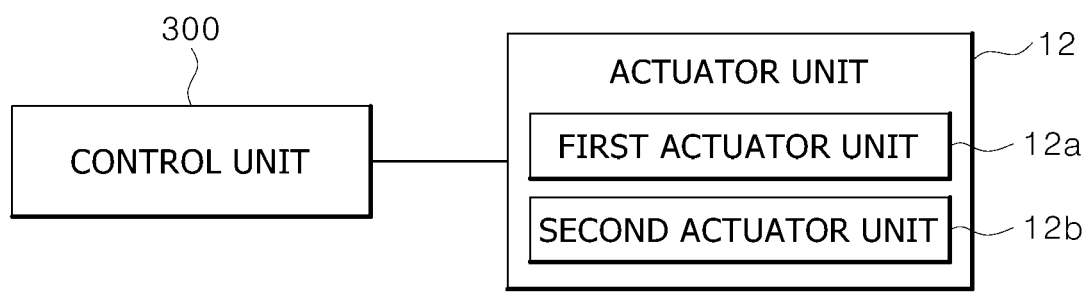
FIG. 4 is a block diagram illustrating a connectional relationship between a control unit of the vehicular variable spoiler lighting apparatus according to the first embodiment of the present disclosure and each of constituent elements thereof.

FIG. 4 is a block diagram illustrating a connectional relationship between a control unit 300 of the vehicular variable spoiler lighting apparatus according to the first embodiment of the present disclosure and each of constituent elements thereof.

With reference to FIGS. 1 to 4, the vehicular variable spoiler lighting apparatus according to the first embodiment of the present disclosure may further include the control unit 300.

The control unit 300 may control operation of each of the first and second actuator units 12*a* and 12*b*.

The control unit 300 is electrically connected to the first actuator unit 12*a* and thus may control the operation of the first actuator unit 12*a* in such a manner that the first spoiler 110 moves in the forward-backward direction of the vehicle.

The control unit 300 is electrically connected to the second actuator unit 12*b*. By controlling the operation of the second actuator unit 12*b*, the control unit 300 may vary the tilting angle of the second spoiler 120 in such a manner that the second spoiler 120 is tilted in the upward-downward direction.

The control unit 300 may control the operation of each of the first and second actuator units 11*a* and 12*b* according to the traveling mode of the vehicle that automatically varies with a signal generated by a vehicular speed sensor of the vehicle. Furthermore, the control unit 300 may control the operation of each of the first and second actuator units 11*a* and 12*b* according to the traveling mode of the vehicle selected by an occupant's manual operation.

The process of operation of the vehicular variable spoiler lighting apparatus, configured as described above, according to the first embodiment of the present disclosure, is described as follows.

With reference to FIGS. 1 and 4, the traveling mode of the vehicle is set to the normal mode, the control unit 300 may control operation of the first actuator unit 12*a* in such a manner that the first spoiler 110 does not protrude toward the opposite direction to the vehicle's forward traveling direction.

The second spoiler 120 moving together with the first spoiler 110 does not protrude toward the opposite direction to the vehicle's forward traveling direction, and the control unit 300 may control the operation of the second actuator unit 12*b* in such a manner that the second spoiler 120 has a tilting angle of 0 degrees.

With reference to FIGS. 2 and 4, when the traveling mode of the vehicle is set to the GT1 mode, the control unit 300 may control the operation of the first actuator unit 12*a* in such a manner that the first spoiler 110 protrudes toward the opposite direction to the vehicle's forward traveling direction. At this point, the second spoiler 120 moving together with the first spoiler 110 moves away from the vehicle's forward traveling direction and protrudes toward the opposite direction to the vehicle's forward traveling direction.

The control unit 300 may control the operation of the second actuator unit 12b in such a manner that the second spoiler 120 continues to maintain its tilting angle of 0 degrees. The movement of the first spoiler 110 may redirect the flow of a vortex formed behind the traveling vehicle, allowing the vehicle to travel a greater distance. In addition, when the vehicle travels at a constant speed or at a high speed, air current is redirected more backward toward the opposite direction to the vehicle's forward traveling direction than during the normal mode, thereby minimizing air resistance.

With reference to FIGS. 3 and 4, when the traveling mode of the vehicle is set to the GT2 mode, the control unit 300 may control the operation of the second actuator unit 12b in such a manner that the second spoiler 120 has a tilting angle greater than approximately 0 degrees.

The control unit 300 may control the operation of the first actuator unit 12a in such a manner that the first spoiler 110, after moving away from the vehicle's forward traveling direction, maintains its state of protruding toward the direction of moving away from the vehicle's forward traveling direction. The tilting operation of the second spoiler 120 may achieve the effect of generating downforce on the vehicle's rear wheels during high-speed traveling, thereby assisting in safe traveling.

Figure 5:
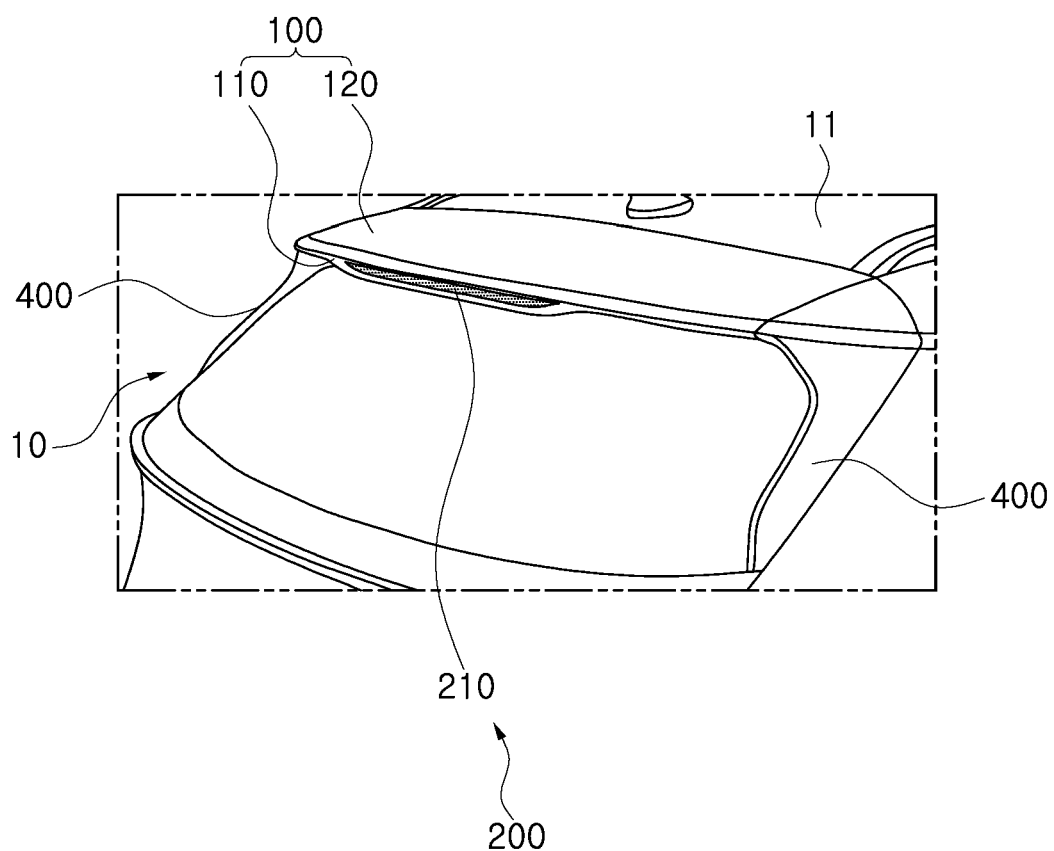
FIG. 5 is a perspective view illustrating a vehicular variable spoiler lighting apparatus according to a second embodiment of the present disclosure.
Figure 6:
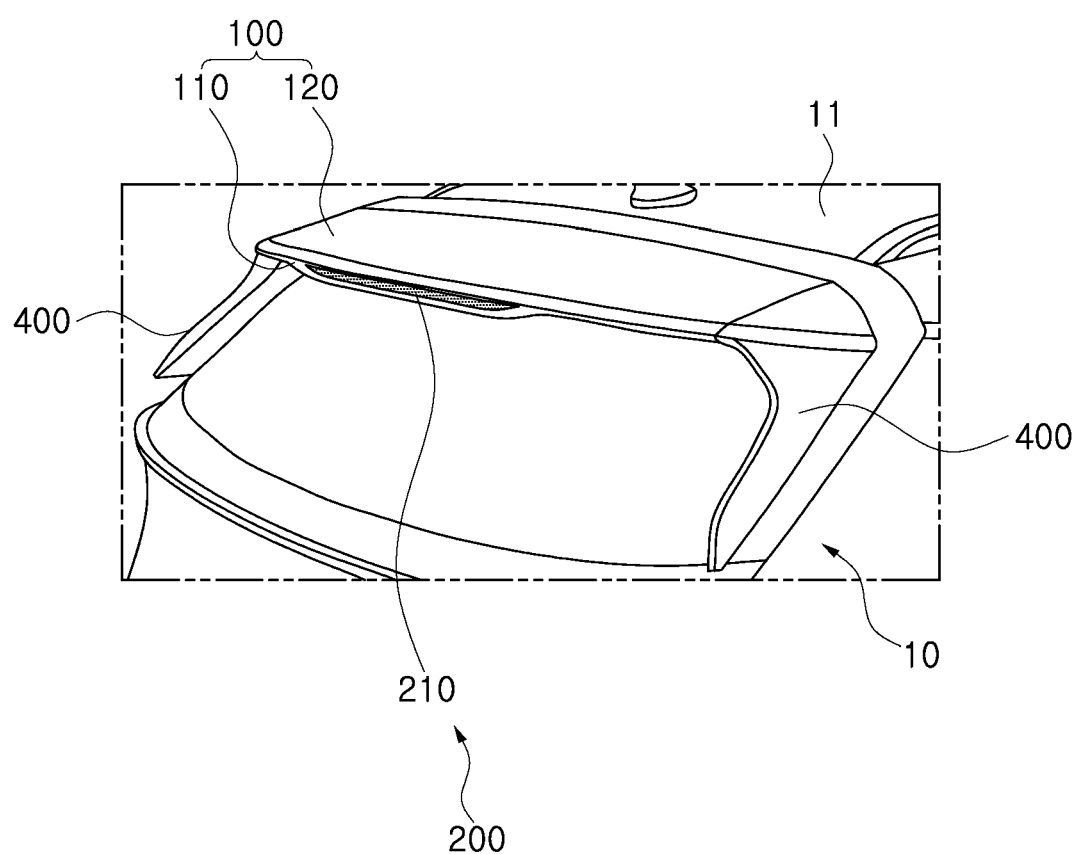
FIG. 6 is a perspective view illustrating a state where the spoiler unit and a side spoiler of the vehicular variable spoiler lighting apparatus according to the second embodiment of the present disclosure move together away from the vehicle's forward traveling direction.
Figure 7:
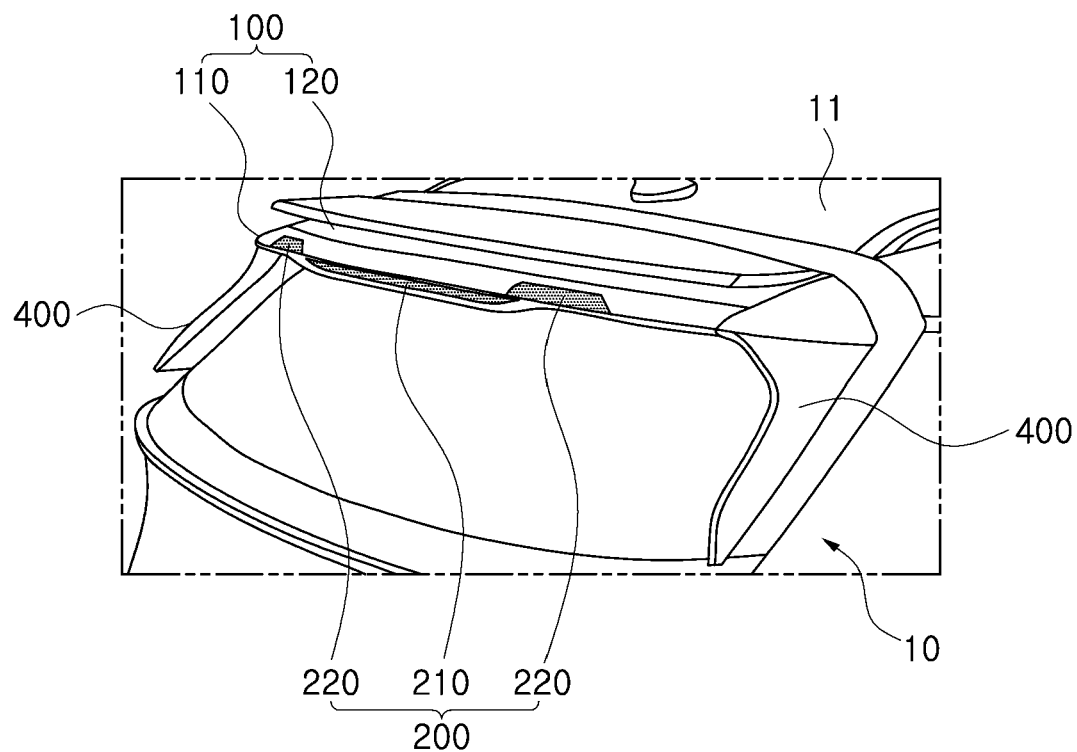
FIG. 7 is a perspective view illustrating a state where the second spoiler of the vehicular variable spoiler lighting apparatus according to the second embodiment of the present disclosure is tilted.

FIG. 5 is a perspective view illustrating a vehicular variable spoiler lighting apparatus according to a second embodiment of the present disclosure. FIG. 6 is a perspective view illustrating a state where the spoiler unit 100 and a side spoiler of the vehicular variable spoiler lighting apparatus according to the second embodiment of the present disclosure move together away from the vehicle's forward traveling direction. FIG. 7 is a perspective view illustrating a state where the second spoiler 120 of the vehicular variable spoiler lighting apparatus according to the second embodiment of the present disclosure is tilted.

With reference to FIGS. 5 to 7, the vehicular variable spoiler lighting apparatus according to the second embodiment of the present disclosure may include the spoiler unit 100, the rear lamp 200, the control unit 300, and side spoilers 400.

Only the side spoilers 400 of the vehicular variable spoiler lighting apparatus according to another embodiment of the present invention, which is not included in the vehicular variable spoiler lighting apparatus according to the first embodiment of the present invention, is described.

Except for the side spoilers 400, the vehicular variable spoiler lighting apparatus according to the second embodiment of the present disclosure has the same configuration as the vehicular variable spoiler lighting apparatus according to the first embodiment of the present disclosure. Therefore, the descriptions of the other constituent elements may apply to the second embodiment of the present disclosure.

The side spoilers 400 may be movably provided in the rear section 10. The side spoilers 400 may be arranged on both sides, respectively, of the rear section 10. The side spoilers 400 may move together with the spoiler unit 100, in conjunction with the spoiler unit 100. In other words, in conjunction with the spoiler unit 100, the side spoilers 400 may move in the forward-backward direction of the vehicle, together with the spoiler unit 100, thereby protruding toward the opposite direction to the vehicle's forward traveling direction.

The side spoilers 400 may be integrally formed with the first spoiler 110 so that they are arranged on both sides, respectively, of the spoiler unit 100 in a manner that orthogonally intersects the first spoiler 110.

The side spoilers 400 may redirect air that, on the side of the vehicle, flows in the direction of moving away from the vehicle's forward traveling direction. In other words, the side spoilers 400 may extend in the upright position in the direction of moving away from the vehicle's forward traveling direction. Thus, the side spoilers 400 may maximize an improvement in aerodynamic performance by reducing a vortex and air resistance that occur behind the vehicle during traveling.

In the vehicular variable spoiler lighting apparatuses according to the first and second embodiments of the present disclosure, the first spoiler 110, which protrudes in the direction of moving away from the vehicle's forward direction according to the traveling mode of the vehicle, can minimize air resistance occurring behind the vehicle, thereby increasing a distance that the vehicle can travel. Furthermore, the second spoiler 120, which varies in tilting angle in the upward-downward direction according to the traveling mode of the vehicle can achieve the effect of generating downforce on the vehicle's rear wheels during high-speed traveling, thereby assisting in safe traveling.

In the vehicular variable spoiler lighting apparatuses according to the first and second embodiments of the present disclosure, the second lamp units 220, which are exposed or not exposed according to the tilting angle of the second spoiler 120, can provide operational information of the second spoiler 120 to a driver of another vehicle or a pedestrian.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lighting apparatus for a variable spoiler, comprising:
a spoiler unit being seated on a roof body of a vehicle and slideably movably provided in a rear section of the vehicle and configured to extend or be tilted toward a direction opposite from a forward traveling direction of the vehicle according to a traveling mode of the vehicle; and a rear lamp provided in the spoiler unit and configured to emit light toward the direction opposite from the forward traveling direction, wherein the oiler unit comprises:

a first spoiler seated on the roof body and being configured to move in a forward-backward direction of the vehicle; and a second spoiler seated on the first spoiler, rotatably coupled to the first spoiler, and being configured to be tilted in a heightwise direction of the vehicle.

2. The apparatus of claim 1, wherein the rear section comprises:

an actuator unit provided on the roof body and connected to the spoiler unit, the actuator unit being configured to move the spoiler unit in a straight line and to vary a tilting angle of the spoiler unit.

3. The apparatus of claim 2, wherein the first spoiler is connected to the actuator unit and configured to move in a forward-backward direction of the vehicle by operation of the actuator unit; and the second spoiler is rotatably coupled to the first spoiler, and connected to the actuator unit, the second spoiler being configured to be tilted in the heightwise direction of the vehicle by the operation of the actuator unit.

4. The apparatus of claim 3, wherein the rear lamp comprises:

a first lamp unit provided in the first spoiler; and second lamp units provided in the first spoiler and arranged on both sides, respectively, of the first lamp unit.

5. The apparatus of claim 4, wherein the second lamp units are configured to be exposed or not exposed according to a tilting angle of the second spoiler.

6. The apparatus of claim 4, further comprising:

a control unit configured to control an operation of each of the first and second actuator units.

7. The apparatus of claim 3, wherein the actuator unit comprises:

a first actuator unit connected to the first spoiler, the first actuator unit being configured to move the first spoiler in a straight line in the forward-backward direction of the vehicle; and a second actuator unit connected to the second spoiler, the first actuator unit being configured to vary a tilting angle of the second spoiler in the heightwise direction of the vehicle.

8. The apparatus of claim 1, further comprising:

side spoilers movably provided in the rear section and arranged on both sides, respectively, of the rear section, the side spoilers being configured to move together with the spoiler unit in conjunction with the spoiler unit.

9. A spoiler apparatus, comprising:

a spoiler assembly comprising first and second spoilers;

a first actuator configured to move the first spoiler along a forward direction;

a second actuator configured to move the second spoiler in a vertical direction relative to the forward direction;

one or more processors configured to execute instructions; and a memory storing the instructions, wherein execution of the instructions configures the one or more processors to:

control the first actuator to move the first spoiler along the forward direction; and control the second actuator move the second spoiler in the vertical direction relative to the forward direction, wherein the first spoiler comprises first lights, the first lights being configured to face in a rear direction, opposite to the forward direction, and wherein the first spoiler further comprises second lights, the second lights being configured to be obscured by the second spoiler while the first spoiler is in a flat orientation.

10. The spoiler apparatus of claim 9, wherein the forward direction is defined by a forward direction of a vehicle comprising the spoiler assembly.

11. The spoiler apparatus of claim 9, wherein the second spoiler is rotatably connected to the first spoiler.

12. The spoiler apparatus of claim 9, wherein the second lights are configured to be exposed in the rear direction when the first spoiler is tilted upward.

13. The spoiler apparatus of claim 9, wherein the controller is further configured to:

control a first movement of the first spoiler and a second movement of the second spoiler responsive to a sensed vehicular speed of a vehicle including the spoiler apparatus.

14. A lighting apparatus for a variable spoiler, comprising:

a spoiler unit movably provided in a rear section of a vehicle and configured to extend or be tilted toward a direction opposite from a forward traveling direction of the vehicle according to a traveling mode of the vehicle; and a rear lamp provided in the spoiler unit and configured to emit light toward the direction opposite from the forward traveling direction, wherein the rear section comprises:

a roof body, the spoiler unit being seated on the roof body in a manner that is slidably movable; and an actuator unit provided on the roof body and connected to the spoiler unit, the actuator unit being configured to move the spoiler unit in a straight line and to vary a tilting angle of the spoiler unit, and wherein the spoiler unit comprises:

a first spoiler seated on the roof body and connected to the actuator unit, the first spoiler being configured to move in a forward-backward direction of the vehicle by operation of the actuator unit; and a second spoiler seated on the first spoiler, rotatably coupled to the first spoiler, and connected to the actuator unit, the second spoiler being configured to be tilted in a heightwise direction of the vehicle by the operation of the actuator unit.

* * * * *